United States Patent [19]

Freychet et al.

[11] Patent Number: 5,773,067
[45] Date of Patent: Jun. 30, 1998

[54] METHOD FOR PRODUCTION OF METERED AMOUNTS OF DRINKS, ESPECIALLY COFFEE

[75] Inventors: Alain Freychet, Chatou; Jean-François Bassereau, Paris, both of France

[73] Assignee: Societe Agricole de Produits de Base, Franconville, France

[21] Appl. No.: 749,827

[22] Filed: Nov. 15, 1996

Related U.S. Application Data

[63] Continuation of Ser. No. 362,967, Dec. 23, 1994, abandoned.

[51] Int. Cl.[6] ........................................................ A23F 5/00
[52] U.S. Cl. ........................... 426/506; 426/432; 426/433; 426/590; 426/594; 426/115; 99/295; 99/300; 99/302 R; 222/92; 222/95; 222/129.1; 383/906; 366/163.2
[58] Field of Search .................................... 426/231, 432, 426/433, 594, 595, 77, 506, 115, 590; 99/295, 300, 302 R, 304, 307, 279; 366/163.2; 222/92, 95, 96, 105, 107, 129.1–129.4, 211, 212, 215, 207, 464.1; 383/906

[56] References Cited

U.S. PATENT DOCUMENTS

| | | | |
|---|---|---|---|
| 2,785,833 | 3/1957 | Bauerlein et al. | 222/129.2 X |
| 2,890,643 | 6/1959 | King | 99/295 |
| 3,185,348 | 5/1965 | Pollak et al. | 222/129.2 X |
| 3,292,527 | 12/1966 | Stasse | 426/115 X |
| 3,372,634 | 3/1968 | Brinkman et al. | 426/115 X |
| 3,402,854 | 9/1968 | Marchetti | 222/129.2 X |
| 3,499,578 | 3/1970 | O'Neal | 426/115 X |
| 3,582,351 | 6/1971 | Austin et al. | 426/432 |
| 3,790,029 | 2/1974 | Ward | 222/129.4 |
| 3,830,940 | 8/1974 | Sivetz | 426/432 X |
| 4,165,821 | 8/1979 | Martin et al. | 222/129.4 |
| 4,194,651 | 3/1980 | Martin et al. | 222/129.4 X |
| 4,275,085 | 6/1981 | Gregg | 426/432 X |
| 4,357,861 | 11/1982 | Di Girolamo | 222/129.4 X |
| 4,470,999 | 9/1984 | Carpiac | 426/506 |
| 4,644,855 | 2/1987 | Woolman et al. | 99/280 |
| 4,757,752 | 7/1988 | Robins et al. | 99/307 X |
| 4,775,048 | 10/1988 | Baecchi et al. | 206/0.5 |
| 4,830,869 | 5/1989 | Wimmers et al. | 426/433 X |
| 5,025,714 | 6/1991 | Brewer | 99/295 X |
| 5,147,071 | 9/1992 | Rutter et al. | 222/92 |
| 5,207,148 | 5/1993 | Anderson et al. | 366/163.2 X |

FOREIGN PATENT DOCUMENTS

| | | |
|---|---|---|
| 716869 | 12/1968 | Belgium . |
| 863866 | 5/1978 | Belgium . |
| 0 125 215 | 11/1984 | European Pat. Off. . |
| 0 179 113 | 4/1986 | European Pat. Off. . |
| 0 211 511 | 2/1987 | European Pat. Off. . |
| 0 223 886 | 6/1987 | European Pat. Off. . |
| 2 583 306 | 12/1986 | France . |
| 2 600 875 | 1/1988 | France . |
| 4409030 | 1/1995 | Germany ............... 426/433 |
| 8702205 | 4/1989 | Netherlands ............ 99/297 |
| 964542 | 7/1964 | United Kingdom . |
| 2123685 | 2/1984 | United Kingdom . |
| 85/05092 | 11/1985 | WIPO . |

*Primary Examiner*—Milton Cano
*Attorney, Agent, or Firm*—Larson & Taylor

[57] ABSTRACT

In the method for preparing metered amounts of a drink in situ such as coffee, from soluble powder, a concentrate of a drink is produced by dissolving determined quantities of soluble powder with water. Then part or all of the concentrate is diluted in hot or cold water in order to produce a metered amount of a drink. The device for the implementation of the method includes an enclosure using a defined large volume of soluble powder and a relatively small defined quantity of liquid such as water, for dissolving the powder in the liquid so as to produce a concentrate in situ, and device for diluting part or all of the concentrate in a liquid in order to rapidly produce individual metered amounts of a drink.

13 Claims, 5 Drawing Sheets

METHOD FOR PRODUCTION OF METERED AMOUNTS OF DRINKS, ESPECIALLY COFFEE

This application is a continuation of application Ser. No. 08/362,967 filed Dec. 23, 1994, abandoned.

BACKGROUND OF THE INVENTION

1. Field of the Invention

The present invention relates to a method and a device for producing, automatically, metered amounts of coffee from instant coffee in powder form. The invention may also be applied to other drinks prepared from soluble powders exhibiting properties similar to those of instant coffee.

2. Description of the Prior Art

Various devices are known which make it possible to produce a metered amount of hot or cold coffee from powdered coffee which is mixed with water. In machines of this kind, for example in automatic drinks dispensers, a metered amount of drink in soluble powder form and a metered amount of hot or cold water are conveyed separately to a preparation chamber, for example a cup, and the mixture is produced either with the aid of a stirring member or simply by a movement imparted to the water.

However, such devices are limited to the delivery of drink in individual metered amounts of relatively small volume, this causing a considerable wait when a large number of metered amounts have to be prepared.

Of course, it is conceivable, if it is desired to prepare larger volumes containing a certain number of metered amounts, to increase the quantities of powder and of water but, unfortunately, the difficulty of achieving good dissolving rapidly increases with the volume of powder.

SUMMARY OF THE INVENTION

The present invention is proposed to overcome these drawbacks and to provide a method and a device for preparing metered amounts of coffee or other drinks from soluble powders, making it possible to very rapidly produce either a large number of individual metered amounts of drinks, or the volumes of drinks corresponding to a plurality of metered amounts, and this is achieved in a particularly simple manner and without using mechanical means liable to break down or to require careful maintenance.

The subject of the invention is a method of preparing metered amounts or pluralities of metered amounts of a drink such as, especially, coffee, from a soluble powder, wherein a concentrate of a drink such as coffee is produced by dissolving defined quantities of powder and of water, and then part or all of the concentrate is diluted in hot or cold water in order to produce a metered amount or a plurality of metered amounts of drinks.

Forming a large volume of liquid coffee concentrate in situ makes it possible to use, for the second step of the method according to the invention, means known already for preparing metered amounts of drinks from concentrates, for example in the field of fruit juices.

The automatic dissolving of large volumes of coffee in soluble powder form in relatively small volumes of liquid for the production of a concentrate is particularly difficult to achieve. As a consequence, according to one particularly preferred embodiment of the method according to the invention, concentrate is produced by dispersing water, in a gentle and homogeneous manner, over the entire upper surface of a volume, preferably spread out horizontally, of soluble powder. Under these conditions, it is found that the coffee powder is dissolved virtually completely without forming an appreciable insoluble residue. This dispersing of water, at the surface of the powder, may be carried out with the aid of spray nozzles judiciously distributed above the volume of powdered coffee, but it is preferred to achieve this by moderate sprinkling using water falling naturally from a plurality of holes in a wall located above the mass of powder, or preferably from a porous wall located above the mass of powder.

In another embodiment, in which the mass of powder has a large vertical height for a smaller surface area, it is possible to pour, directly but gently, water over the mass of coffee so as to form a liquid upper mass which progressively descends, dissolving the successive powder layers encountered as it passes, while the quantity of water is progressively topped up.

In the first embodiment of the invention, the coffee powder is preferably packaged in the form of horizontal trays.

In the second embodiment of the invention, the coffee can be packaged in relatively elongate bags.

It turns out that the coffee concentrate produced is not only easy to dissolve, in order to produce the drink, but is also preserved, without deterioration, for a period of several days, or indeed several tens of days.

In a particularly preferred embodiment of the invention, the desired quantity of drink concentrate is diluted in a hot or cold liquid, for example according to whether it is desired to prepare hot coffee or cold coffee, by suction using the Venturi effect, for example in accordance with European Patent EP-A-0,179,113.

It is thus possible to rapidly prepare a large number of individual metered amounts of coffee, or large volumes corresponding, for example, to a plurality of metered amounts, without using, at any stage in the method according to the invention, mechanical devices, so that any risk of breakdown is virtually eliminated and maintenance is reduced to its simplest expression.

The subject of the invention is also a device for the implementation of the method according to the invention, which device includes first means, using a defined large volume of soluble powder and a relatively small defined quantity of liquid such as water, for dissolving the powder in the liquid so as to produce a concentrate and second means for diluting part or all of the said concentrate in a liquid such as, for example, hot water in order to rapidly produce individual metered amounts or a plurality of metered amounts of drink.

In a first embodiment, said first means include an enclosure, preferably having a relatively large surface area, containing or receiving the powdered drink, and homogeneous spraying, sprinkling or wetting means supplying, in a homogeneous and gentle manner, liquid over the entire upper surface of the enclosure.

In a particularly preferred embodiment of the invention, this enclosure consists of a tray-shaped container in which the powdered coffee is preferably packaged, the device according to the invention having means for supplying water onto the surface of the coffee contained in the tray. Preferably, the tray is closed, at its upper face, by a double cover having a porous lower sheet and an impermeable, for example plastic or metal, upper sheet and the device includes means, such as a cannula for example, which are designed to penetrate into a space located between the two sheets of the double cover and to distribute the water in a homogenous manner in this space, the water subsequently flowing away uniformly downward through the porous sheet in order to progressively wet and dissolve the powdered coffee. Advantageously, preparation means are provided for producing one or more passages for the air to escape.

In a variant, the tray has a single, peelable or tearable, preserving cover and the device presents, permanently, a substantially horizontal porous sheet through which the water, supplied in suitable quantity, is uniformly distributed over the surface of the tray.

In another variant, this sheet is replaced by other water distribution means, for example a plurality of homogeneous perforations extending over the entire surface area above the tray or else by means for gently spraying the surface.

In another, less preferred variant, the coffee may not be contained in a tray but is poured into an enclosure, for example a tray-shaped container presented by the device, with, however, the drawback of requiring this enclosure to be cleaned from time to time.

The drink concentrate in the tray is preferably taken off via the lower part of the tray, for example by penetration of an evacuating needle, for example into a collecting well located at the lower part of the tray.

In another embodiment of the invention, for example in the case of powdered coffee contained in a sealed bag more tall than wide, it-is possible either to supply the water in accordance with the embodiments which have just been described or to pour water directly over the surface of the mass of powdered coffee, for example right inside the suitably opened bag, for example with the aid of a water supply pipe. Preferably, the water is supplied, for example by spraying, at the top of the bag with a flow rate such that a liquid upper mass is formed which descends progressively, dissolving the successive coffee powder layers encountered, while the quantity of water is progressively topped up.

The coffee bag may advantageously, in this case, include, toward its upper part, a plastic cap or similar piece which can be easily pierced for the passage of a water distribution member at the upper part of the bag, such as, for example, a spray nozzle.

This cap may advantageously include a generally cylindrical part of small height, a base connected peripherally to one of the bases of the cylindrical part in order to form a fixing zone, for example by adhesive bonding, to the coffee bag at its upper part, and a sealing cover which can be easily opened, when the bag is put into the machine for producing the coffee concentrate, for the passage of the spray head. Furthermore, this cap may advantageously include tearing means such as, for example, one or more sharp points extending beyond said base in order to partially perforate and tear the coffee bag when the cap is applied against the wall of the coffee bag and when the cap is fixed against this wall, for example by adhesive bonding.

Said second means of diluting the coffee concentrate may be any means such as those used in machines for dispensing drinks based on concentrate, for example fruit juice concentrate.

However, it is particularly preferable that said second means include a suction chamber, using the Venturi effect, connected to the liquid source, for example to a water tank equipped with means for heating the water, a suction line connecting the coffee concentrate, in its tray for example, to said suction chamber, which comes out into a dispensing line. Preferably, a nonreturn valve is located in the suction line.

In an advantageous embodiment, the device may thus include a water source, for example a hot water source, a line for taking off hot water ending in said suction chamber or nozzle, possibly a branch line for directly dispensing hot water intended for other applications, said suction line coming out into the enclosure containing the liquid concentrate, a source of liquid intended to be supplied to said enclosure for dissolving the powder and a line between said source and said enclosure. Preferably, there is only one liquid source and, in this case, a line for dissolving leaves the source and is directed toward the upper part of the enclosure.

The device according to the invention can be designed in a particularly compact manner, the enclosure containing the concentrate, for example the tray, being preferably located at the upper part of the device so that the suction line is substantially vertical.

In the case in which the concentrate is produced right inside a coffee bag whose height is large compared to its area and in which the abovementioned cap has been intended to be placed at the upper part of the bag, this bag may advantageously be used not only for the passage of a water supply means in order to produce the coffee concentrate, but also for the passage of a dip tube whose lower end is directed toward, and stops at a certain distance from the bottom of the bag and whose upper part is connected or is connectable to the suction means such as, for example, a mixing device of the Venturi type.

For this purpose, the device diluting the concentrate, for the preparation of the metered amounts, may include such a dip tube, which is preferably removable, that is inserted into the coffee packet, before or after forming the concentrate, for example through the passage provided in the cap, or a second passage provided in the cap and separated from a first passage through which the spray nozzle may pass, dissolving the coffee powder. However, in another embodiment, the dip tube, in this case preferably made of an inexpensive and disposable material, such as foodgrade plastic, may form an integral part of the cap which includes, in this case, on the one hand, the passage permitting insertion of the water spray nozzle and, on the other hand, on the internal side of the bag, the dip tube which extends down into the coffee powder to close to the bottom, and, on the external side, a connector permitting easy connection to a nozzle on the coffee machine leading toward the Venturi or vacuum-creating member, mixing the concentrate with water in order to form the metered amounts.

Adjustment of the coffee metering may advantageously be carried out by calibrating the diameter of a suction hole for the concentrated coffee. This diameter may be determined by a pierced disc located at any point between the point at which the concentrated coffee is sucked out and the chamber of the Venturi.

By way of example, the- invention enables 2.2 liters of concentrate to be produced in 30 seconds after which it is possible to produce, with the aid of a three-kW electrical heating element, one liter of coffee per minute at a temperature of 68° to 73° C., and this is achieved without using any driving element other than simple solenoid valves.

Other advantages and characteristics of the invention will appear on reading the following description, given by way of nonlimiting example and with reference to the appended drawings in which:

DESCRIPTION OF THE PREFERRED EMBODIMENTS

Figure 1:
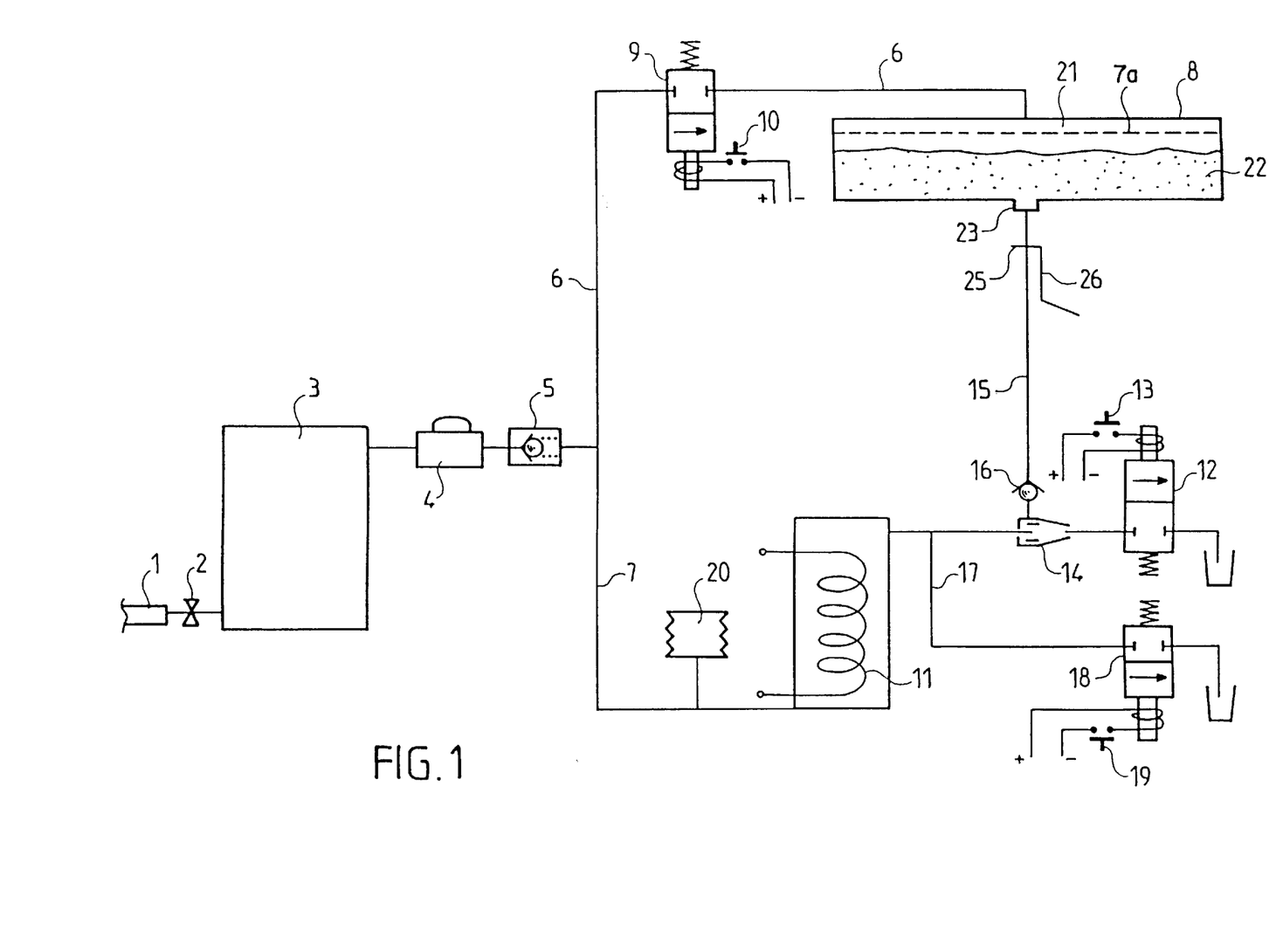
FIG. 1 represents a general diagrammatic view of a device according to the invention.

The coffee machine according to the invention is fed via the portable water main 1. This machine includes, beyond a valve 2, a device 3 for filtering and purifying the water, based on active charcoal.

On leaving this filtration device 3, the water feed pipe includes a relief valve 4 which makes it possible to set and adjust the use pressure inside the machine, for example around 1.4 bar. A nonreturn valve 5 enables the relief valve and the purification apparatus to be isolated from the rest of the machine.

Downstream of this valve 5, the water feed line is divided into two branches 6 and 7. The branch 6 forms a first pipe which connects the water feed to an enclosure 8 which contains the instant coffee powder. A solenoid valve 9, normally closed, is placed in this first pipe 6 and can be opened by manually actuating a push button 10.

The second branch 7 of the line forms a second pipe which, in the example represented, passes through a boiler 11 and ends at a member 12 for drawing off the drink, this member 12 being constituted by a solenoid valve which is normally closed and manually actuated to open by a push button 13.

This second pipe 7, between the boiler 11 and the solenoid valve 12, and in the proximity of this solenoid valve 12, includes a suction device 14, for example a Venturi nozzle, enabling a partial vacuum to be generated in a third pipe 15. This third pipe 15 comes from the enclosure 8. The pipe 15 possesses a nonreturn valve 16 preventing water from the pipe 7 to flow toward the pipe 15.

Upstream of the Venturi 14, the pipe 7 possesses a branch line 17 which is also equipped with a drawing-off member 18 namely a solenoid valve which is normally closed and actuated to open by a push button 19, enabling only hot water to be drawn off.

On the second pipe 7 is represented an expansion vessel 7a which, on heating the water in the boiler 11, enables the pressure prevailing in this pipe to be limited to approximately 3 bar. The unidirectional valve 5 protects the relief valve 4 from this overpressure.

The enclosure 8 for preparing the coffee concentrate has a parallelepipedal shape whose largest base is horizontal. The enclosure 8 is divided into two parts or volumes by a horizontal sheet 20 whose function will be explained below. The first volume 21, located above the sheet 20, receives, in its upper part, the outlet of the water supply line 6. The lower volume 22, forming the second part of the enclosure, is filled, over the greater part of its height, with a layer of instant coffee in powder form. A small collecting well 23 permits the outlet, into the enclosure, of the pipe 15.

The horizontal sheet or wall 20 is made of a porous or perforated permeable material the function of which is to let through, uniformly and in a homogeneous manner, the water coming from the line 6 into the volume 21 in order for this water to be poured downward, gently and in a homogeneous manner, over the layer of powdered coffee in the volume 22 in order to provide homogeneous wetting of the layer via the top.

This sheet may be made of any material permitting uniform and homogeneous pouring of the water. It may, for example, be made from fibrous layers, for example inorganic or organic fibers. It may also consist of a permeable or porous textile sheet made of a woven or nonwoven fabric, or else made of a metallic material, for example metal fibers or a metal fabric, or else the sheet may consist of a porous membrane of the usual type or made of a porous layer of a sintered material. The sheet 20 may also consist of a metal sheet or a metal or nonmetal wall provided with a plurality of fine perforations enabling the water to fall as drops onto the upper layer of instant coffee.

The operation is as follows:

By actuating the manual control button 10, the solenoid valve 9 is opened so that a defined quantity of water coming from the filter 3 is supplied via the pipe 6 to the enclosure 8. The quantity of water is adjusted, for example by means of a delay counter of the solenoid valve 9. The water which is inlet into the enclosure 8. spreads out in the upper volume 21 above the porous sheet 20 and starts to spread uniformly downward through the sheet in order to impregnate the layer of coffee powder which is progressively dissolved, and when the predetermined quantity of water has been supplied into the enclosure and has passed through the sheet 2, it is found that all the coffee powder in the volume 22 has been dissolved and the volume 22 is filled with a coffee concentrate. The proportions of coffee and water are preferably 1½ in volume.

One or more air vents (not shown) are provided at the upper part of the enclosure 8 so as to allow air to escape progressively as water arrives and dissolves the powdered coffee.

Once the powdered coffee has been dissolved and forms the concentrate, it is possible to draw off the desired quantities of coffee. In order to do this, the push button 13 is pressed, thereby supplying a flow of hot water coming from the boiler 11 through the Venturi 14 and causes a partial vacuum in the vertical line 15. This partial vacuum sucks out the concentrate in the enclosure 8, which concentrate is mixed, inside the Venturi, with water coming from the boiler in a proportion of $\frac{1}{10}$ in order to form the coffee, ready to be consumed, which will be poured into a cup.

By suitably delaying the solenoid valve 12, it is possible to obtain, according to choice, cups of coffee or large quantities of coffee in coffee pots.

The machine according to the invention may be designed in a compact manner, by being placed, for example, inside a cowl and providing the enclosure 8 in the upper part of it, the other elements being arranged in a compact manner at a lower level.

Figure 2:
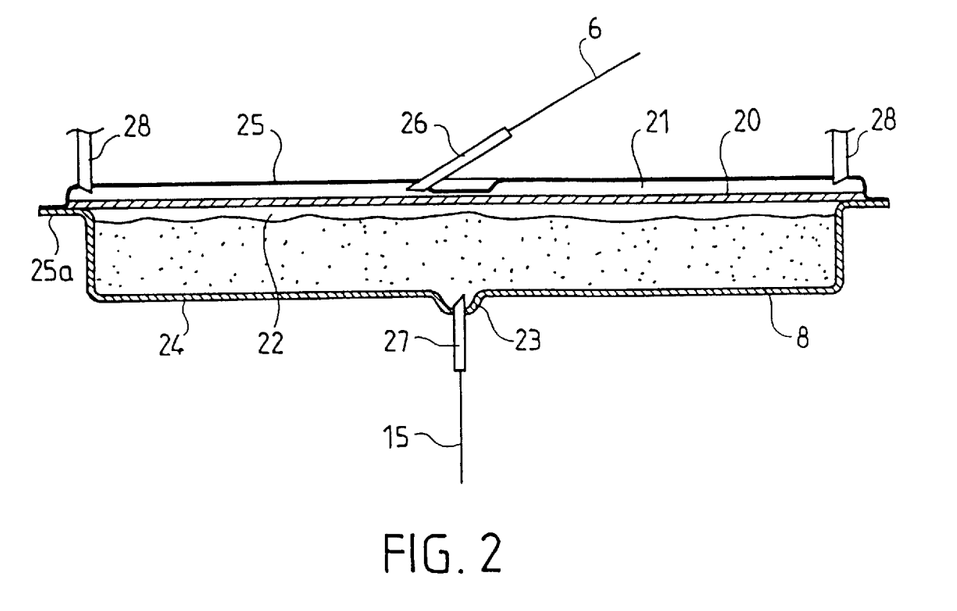
FIG. 2 represents a sectional view of a tray of instant coffee powder according to the invention.

Reference is now made to FIG. 2.

In a particularly advantageous embodiment of the invention, the enclosure 8 is produced by a tray 24, for example made of thermoformed plastic. This parallelepipedal tray has a peripheral upper rim 25a over which is stretched and to which is adhesively bonded the porous sheet 20. Placed above the porous sheet 20 is an impermeable semirigid wall 25, for example made of plastic or a metal foil or a composite material, as used for forming food covers. This wall 25 has the shape of a shallow inverted tray so as to determine, between it and the sheet 20, the upper volume 21.

The powdered coffee is thus packaged by the manufacturer who delivers the trays filled with powder to the operators of the machines according to the invention.

The line 6 is continued by a bevelled perforating cannula 26 which is made to penetrate through the upper wall 25 so as to supply water from- the line 6 into the volume 21. Likewise, the well 23 at the lower part of the tray may be perforated by a bevelled cannula 27 penetrating into the well 23 in order to establish communication between the inside of the tray and the line 15. Furthermore, this line destroys the tray, which may no longer be reused. Venting of the air may be carried out via one or more vertical cannulas 28 which penetrate slightly into the chamber 21 through the upper wall 25.

Figure 2A:
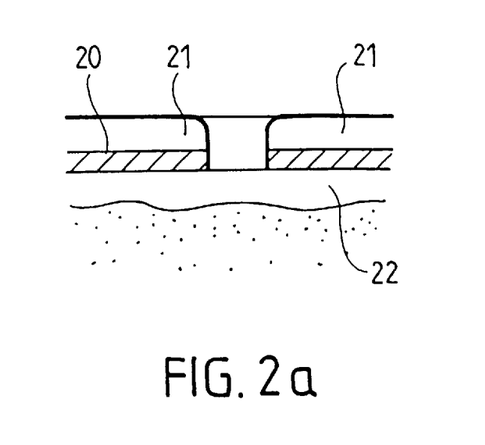
FIG. 2a represents a sectional view of a part of a tray similar to the tray of FIG. 2, with a venting passage.

If it is estimated that the air is not evacuated sufficiently well through the porous sheet 20, it is possible to vent the air from the lower volume 22 via a vent ending in the volume. This may be achieved, for example, by locally interrupting the sheet 20 in order to form a passage ending in the open air, the impermeable wall 25 extending hermetically around this passage. Such a construction has been represented in the diagram 2a.

For the passage of the cannula 26, it is possible to provide reliefs or depressions in the wall 25 so as to facilitate the water supply.

The wall 25, instead of being semirigid, may also consist of a permeable membrane 1, of the food-cover kind, through which the cannula may pass.

Figure 3:
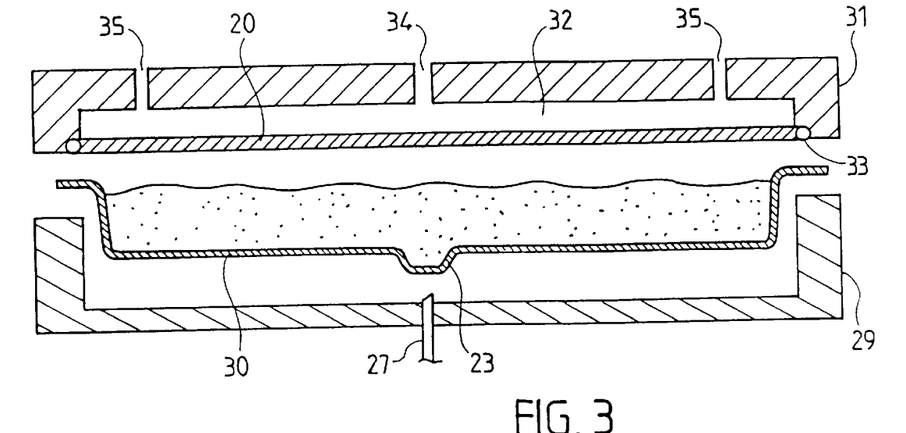
FIG. 3 represents a view similar to FIG. 2 for a variant of the invention.

Referring to FIG. 3, an embodiment example may be seen in which a tray is still used but this forms only part of the enclosure. For this purpose, the apparatus comprises a lower support 29 in which a tray 30 filled with powdered coffee may be housed after the upper cover (not represented), closing the upper part of the tray, has been deposited beforehand. A second element 31 has a chamber 32 acting as the volume 21 and closed off at its lower part by the porous sheet 20. Having laid the tray in the support 29, this causing perforation of its well 23 by the cannula 27, a peripheral seal 33 provides sealing when the element 31 is applied to the support 29. Water is supplied via a passage 34 connected to the pipe 6, the air being vented via vents 35.

Figure 4:
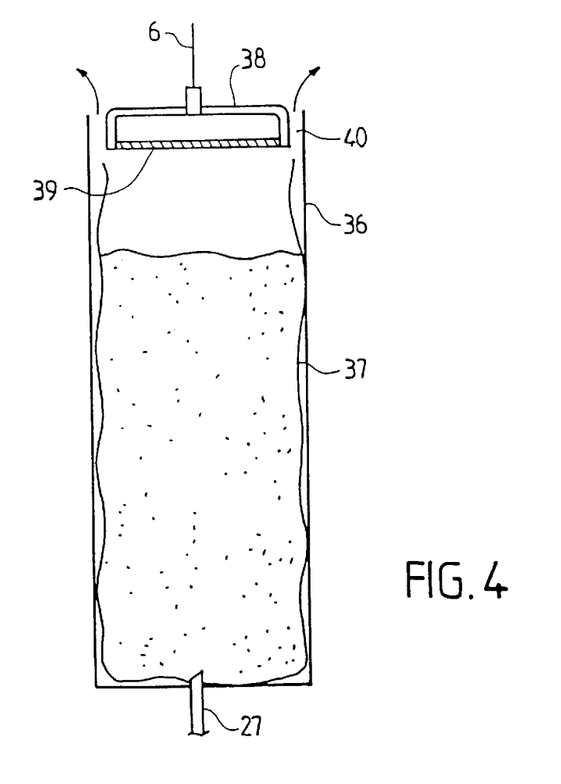
FIG. 4 represents a diagrammatic view of the enclosure for another embodiment of the invention.

Finally, in another embodiment, the machine provides a vertical cylindrical container 36 in which a cylindrical coffee bag 37 may be placed after having largely opened it beforehand. A device 38, located at the upper part of the container, has a porous sheet 39 which can also be replaced by a perforated sheet and is fed with water via the pipe 6. The water is supplied into the internal volume of the device 38, then spreads out into droplets and falls onto the underlying coffee contained in the bag 37 whose bottom has been perforated by a cannula 27 connected to the line 15. In this case, a wide passage 40 is provided in the upper part for easy venting of the air.

In order for the water to descend homogeneously, over the entire surface, for example through a porous sheet such as 20, or a perforated membrane, provision may be made to establish a pressure in the volume above the sheet in order to force the water through the sheet in a homogeneous manner. Conversely, a partial vacuum may be established in the volume containing the coffee powder, for example in the volume 22 of the tray, for example through the venting passage (FIG. 2a). In these embodiments, the sheet 20 is preferably rigid or rigidified.

Figure 10:
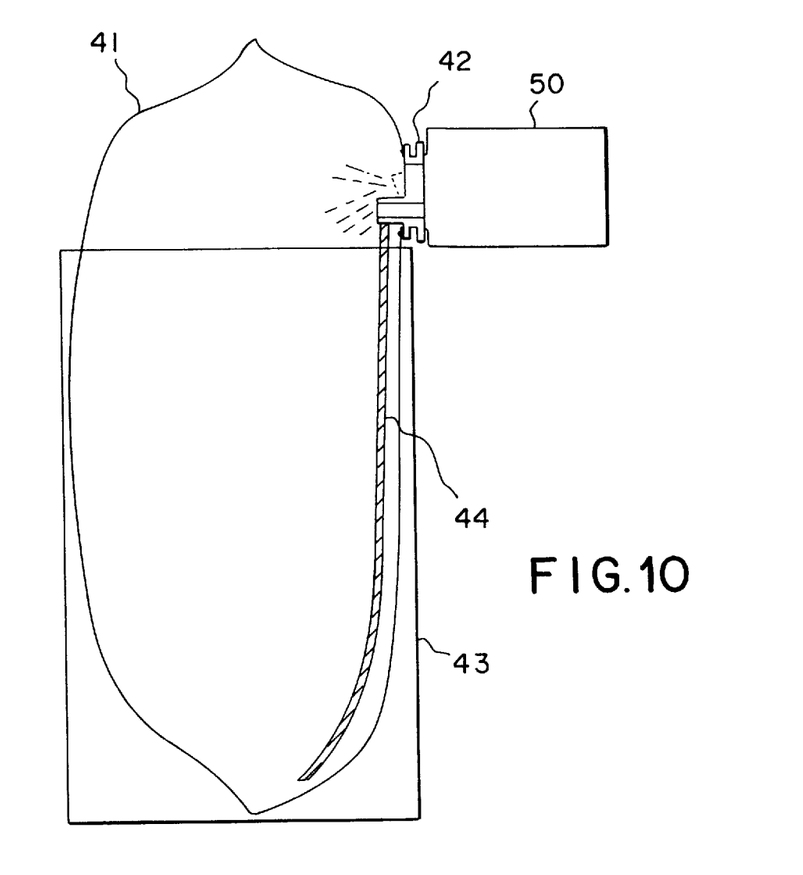
FIG. 10 represents a diagrammatic view of the coffee bag in such a machine.

Referring to FIG. 10, an elongate vertical bag of instant coffee 41, of a commercially common type, may be seen. A cap 42 has been fixed to its upper part. The bag is inserted into a vessel 43 of a machine for preparing metered amounts of coffee ready for consumption and a dip tube has been represented, at 44, which penetrates into the bag through an opening in the cap 42 in order to suck out the coffee concentrate.

Figure 5:
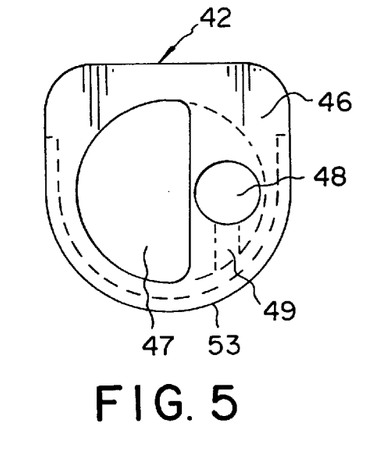
FIGS. 5 and 6 represent a view from below and a side view of a cap of a coffee bag.
Figure 6:
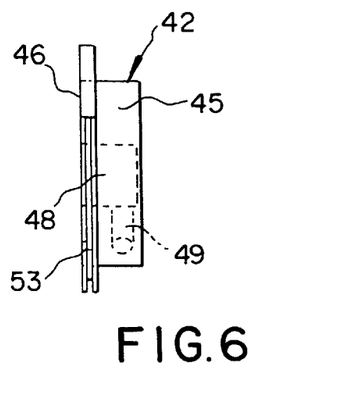

Referring to FIGS. 5 and 6, it may be seen that this cap 42 advantageously has a cylindrical body 45 of substantially semicircular cross section, one of the bases of which connects with a shoulder or seat 46 of which that face opposite the one seen in FIG. 5 permits adhesive bonding to the wall of the bag 41. The seat 46 has a central passage 47. This passage has substantially a semicircular cross section. The cylinder 45 is solid, but has a blind hole 48 open on the side where the seat 46 is and closed on the other side of the cylinder. A second, transverse, hole 49 connects the blind hole 48 to the sidewall of the cylinder.

Part of the periphery of the seat 46 has a peripheral groove 53 which will serve for positioning on and fixing to the coffee machine. Finally, a removable cover, not represented, is fixed to that face of the seat visible in FIG. 5 in order to mask, in a sealed manner, the holes 47 and 48.

Before putting the cap on the coffee bag and fixing it thereto, for example by adhesive bonding, a hole has been made beforehand in the bag, this hole providing communication from the inside of the bag with the two passages 47 and 49.

Once the bag 41 has been placed in the container 43 of the machine, the cap 42 of the bag, the cover of which has been removed, is applied against a head 50 which has retention means, not represented, enabling the cap 42 to be immobilized in the vertical position represented, by interacting with the groove 53. In this position, a water spray nozzle 51 mounted so as to be fixed in the head 50, and making an angle of 45° with the vertical, penetrates into the passage 47. This nozzle 51 is connected via a pipe, not otherwise described, to a water feed source.

Figure 7:
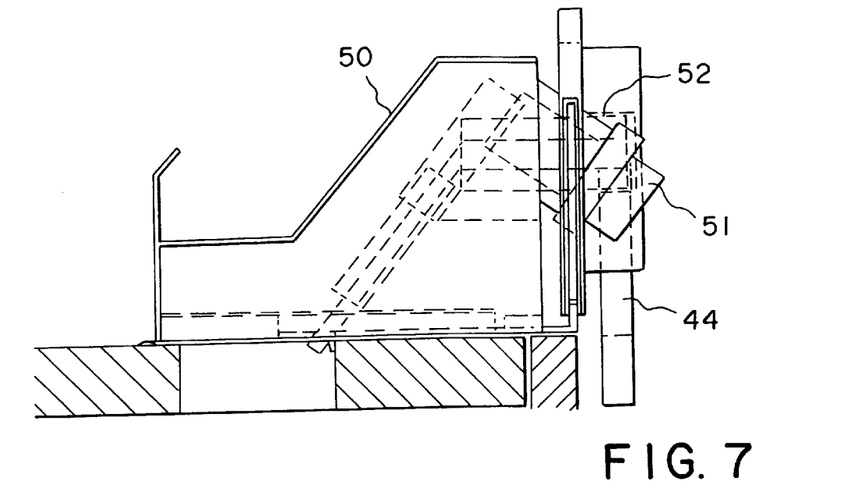
FIGS. 7 to 9 represent views of this cap in the operating position on a head of the device for producing metered amounts of coffee.
Figure 8:
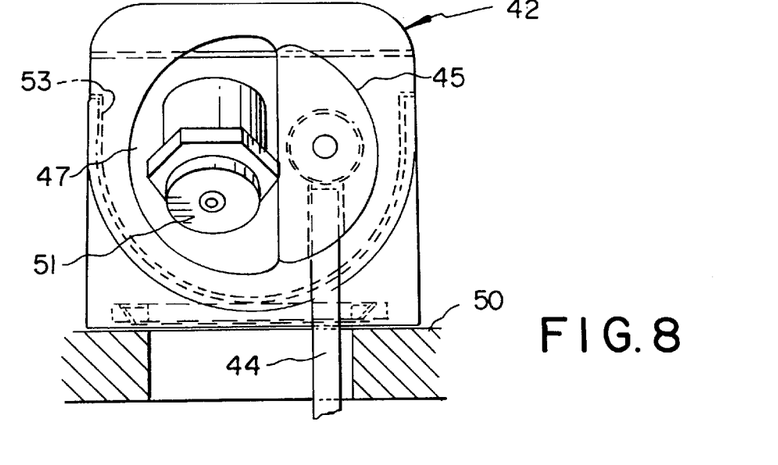
Figure 9:
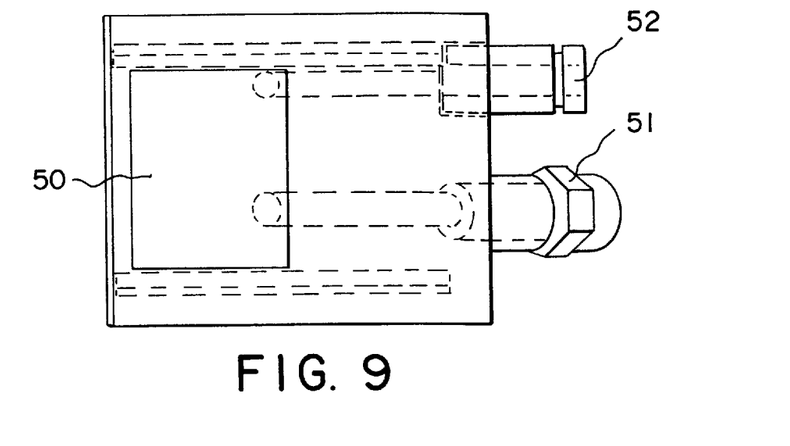

Before adhesively bonding the cap to the coffee bag, an elongate flexible dip tube 44, the lower opening of which is located toward the bottom of the bag, is forcibly inserted into the hole 49. When the cap has been placed in its position on the machine, a tubular connection piece 52 is made to penetrate, in a sealed manner, into the passage 48, this connection piece 52 being connected, via a suitable line, to a known device for mixing using suction by virtue of a vacuum-creating member such as a Venturi.

The operation is as follows. The bag having thus been placed with the cap against the head 50, water is introduced by spraying or by another form of injection via the nozzle 51 with a flow rate sufficient for a volume of water to accumulate at the surface of the coffee powder. This volume of water will subsequently descend, progressively dissolving the underlying layers of coffee which it encounters and, during this period, water continues to be fed until the entire volume of water necessary for the concentrate has been sprayed. The descent of the volume of water, in which volume the coffee is concentrated, progressively, dissolves the powder completely. Once the powder has dissolved, the coffee concentrate is sucked out via the tube 44, the passage in the cap, the connection piece 52 and the suction and mixing device, and it is thus possible to dispense the metered amounts of coffee.

We claim:

1. A method of automatically preparing at least one metered amount of a drink from a soluble powder in situ in a drink preparation device comprising the steps of:

completely dissolving under atmospheric pressure a defined quantity of said powder forming a volume having an upper surface contained in an enclosed receptacle in said device by dispersing under atmospheric pressure a defined quantity of water, in a gentle and homogeneous manner, over said upper surface of said volume of soluble powder into said enclosed receptacle with a flow rate sufficient for a volume of water to accumulate at the surface of the powder to produce a concentrate of a drink contained in said enclosed receptacle while venting said enclosed receptacle;

storing said concentrate of a drink in said enclosed receptacle;

and, subsequently, taking off part or all of said concentrate from said enclosed receptacle and diluting the taken off concentrate in water to produce at least one metered amount of said drink.

2. The method as claimed in claim 1 wherein said dissolving step includes the step of dispersing water in a gentle and homogeneous manner over the totality of said upper surface of said volume of soluble powder in said enclosure.

3. The method as claimed in claim 2, in which said volume of powder in said enclosure has a vertical height and a smaller horizontal surface area comparative to said height, wherein said defined quantity of water is dispersed over said upper surface of said volume so as to form a liquid upper mass which progressively descends, dissolving the powder encountered as it passes while water of said defined quantity of water is progressively topped up.

4. A method according to claim 3 wherein, said defined quantity of powder is powdered coffee in a bag, which bag is intended to permit production of a coffee concentrate by the introduction of water into the bag, and then the delivery of the concentrate into a device for dispensing metered amounts of diluted coffee from the concentrate, said bag carrying, near its upper face, a cap which includes at least one passage permitting introduction of water supply means by which said defined quantity of water is directly, but gently poured over said upper surface.

5. A method according to claim 3, wherein said defined quantity of water is directly, but gently poured over said upper surface by spraying means.

6. The method as claimed in claim 2, wherein the powder is packaged in the form of horizontal trays in which the concentrate is produced.

7. The method as claimed in claim 1, wherein said part or all of said concentrate is diluted in a liquid by suction using a Venturi effect.

8. A method according to claim 1, wherein said enclosure is a bag which contains said defined quantity of powder, said bag carrying, near its upper surface, a cap which includes at least one passage permitting introduction of water supply means, said cap comprising venting passage means and a dipping tube for removing said concentrate.

9. A method according to claim 8, wherein said powder is soluble coffee.

10. A method of automatically preparing metered amounts or pluralities of metered amounts of a drink, from a soluble powder in situ in a drink preparation device, comprising the steps of:

placing in a container part of said device, a bag containing a defined quantity of said powder forming in said bag a volume having an upper surface, dispersing under atmospheric pressure a defined quantity of water, in a gentle and homogeneous manner, over the totality of said upper surface of said volume of soluble powder in said bag with a flow rate sufficient for a volume of water to accumulate at said surface of the powder, to completely dissolve said powder and to form a concentrate of drink in said bag;

and diluting part or all of said concentrate in water to produce a metered amount or a plurality of metered amounts of said drink while venting said bag.

11. The method as claimed in claim 10, in which said volume of powder in said enclosure has a vertical height and a smaller horizontal surface area, comparative to said height wherein said defined quantity of water is dispersed over said upper surface of said volume so as to form a liquid upper mass which progressively descends, dissolving the powder encountered as it passes while water of said defined quantity of water is progressively topped up.

12. A method according to claim 11, wherein said bag carries, near its upper surface, a cap which includes at least one passage permitting introduction of water supply means.

13. A method according to claim 10 wherein said defined quantity of water is sprayed over said upper surface.

* * * * *